US008656500B2

(12) United States Patent
Slowik

(10) Patent No.: US 8,656,500 B2
(45) Date of Patent: Feb. 18, 2014

(54) METHOD AND DEVICE FOR CONTROLLING USER DIALOG ON TECHNICAL EQUIPMENT

(75) Inventor: Adrian Slowik, Paderborn (DE)

(73) Assignee: Wincor Nixdorf International GmbH (DE)

( * ) Notice: Subject to any disclaimer, the term of this patent is extended or adjusted under 35 U.S.C. 154(b) by 158 days.

(21) Appl. No.: 12/936,863

(22) PCT Filed: Mar. 31, 2009

(86) PCT No.: PCT/EP2009/053794
§ 371 (c)(1),
(2), (4) Date: Oct. 7, 2010

(87) PCT Pub. No.: WO2009/127516
PCT Pub. Date: Oct. 22, 2009

(65) Prior Publication Data

US 2011/0035797 A1 Feb. 10, 2011

(30) Foreign Application Priority Data

Apr. 17, 2008 (DE) ......................... 10 2008 019 478

(51) Int. Cl.
*G06F 21/00* (2013.01)

(52) U.S. Cl.
USPC ................................. 726/26; 705/42; 705/43

(58) Field of Classification Search
None
See application file for complete search history.

(56) References Cited

U.S. PATENT DOCUMENTS 4,682,158 A * 7/1987 Ito et al. ........................ 340/679
4,964,125 A 10/1990 Kim
6,750,878 B1 * 6/2004 Tatsuo et al. .................. 715/705
2006/0161272 A1 * 7/2006 Haller et al. .................... 700/29
2007/0018986 A1 * 1/2007 Hauser .......................... 345/440
2008/0004764 A1 * 1/2008 Chinnadurai et al. .......... 701/29
2008/0243566 A1 * 10/2008 Godwin ............................ 705/7
2009/0228248 A1 9/2009 Klein et al.

FOREIGN PATENT DOCUMENTS

DE 689 29 289 8/1989
DE 10 2005 057 697 6/2007
EP 0685768 A1 12/1995

OTHER PUBLICATIONS

Dreyfus, Operations Research, vol. 17, No. 3 (May-Jun. 1969), pp. 395-412.*
Translation of International Preliminary Report on Patentability for PCT/EP2009/053794 (Nov. 18, 2010).

* cited by examiner

*Primary Examiner* — Benjamin Lanier
(74) *Attorney, Agent, or Firm* — Harness, Dickey & Pierce, P.L.C.

(57) ABSTRACT

A method and a device for controlling user dialogues on a technical installation that is to be controlled or to be maintained, for example, a cash dispenser or a deposit refund device. According to said method or said device, a calculating unit evaluates the data relating to the state of the technical installation and in accordance with said data, emits at least one visual request consisting of textual and/or pictorial instructions (INSTR, CHK) for a user who controls the technical installation. The method processes the data using a directed graph (GRPH) comprising nodes (1000, . . . , 1300 . . . ) and edges (INSTR; CHK) connecting the nodes. Said nodes relate to different maintenance conditions of the installation, and the edges relate to the instructions (INSTR; CHK) for the user for transferring the installation from one of the nodes to another node.

9 Claims, 6 Drawing Sheets

1. Check
2. Release + pull out
3. Open
4. Remove
5. Check
6. Close
7. Insert
8. Check 1. Check
2. Release + pull out
3. Open
4. Remove
5. Check
6. Close
7. Insert
8. Check 1. Check
2. Release + pull out
3. Open
4. Remove
5. Check
6. Close
7. Insert
8. Check 1. Check
2. Release + pull out
3. Open
4. Remove
5. Check
6. Close
7. Insert
8. Check

METHOD AND DEVICE FOR CONTROLLING USER DIALOG ON TECHNICAL EQUIPMENT

CROSS-REFERENCE TO RELATED APPLICATIONS

This application is a National Stage of International Application No. PCT/EP2009/053794, filed Mar. 31, 2009. This application claims the benefit and priority of German application 10 2008 019 478.6, filed Apr. 17, 2008. The entire disclosures of the above applications are incorporated herein by reference.

BACKGROUND

This section provides background information related to the present disclosure which is not necessarily prior art.

TECHNICAL FIELD

The invention relates to a method for controlling user dialogs on a technical installation or equipment to be serviced for maintenance and to a device to carry out the method. In particular, the invention relates to a method and device for controlling user dialogs during service maintenance of equipment in the form of an automated teller machine or a deposit refund device.

DISCUSSION

It has been shown that, especially with complex mechatronic installations or equipment or devices, service or maintenance requires a selective and structured procedure so that the user, or service technician, performs the required activities as quickly and effectively as possible. Methods and devices for controlling user dialogs are already known in the prior art that make operation and maintenance of such technical installations easier. In particular where copiers and printers are in use, computer-controlled methods are known that generate textual and/or pictorial instructions for the user or service technician as part of a user dialog and show them on a display so that the required operating and/or maintenance steps can be carried out in a sequence specified by the user dialog.

A service management system is known from EP 0685768A1 for a printer in which a computing unit evaluates data about the condition of the printer and, as a function of this evaluation, controls a visual output of textual and pictorial instructions (refer to FIGS. 1-5 there) to display the necessary steps in each case to the user in the event of service and maintenance. It is no longer necessary to have any special knowledge of the device's construction because the user is referred specifically to the activities to be undertaken in each instance on the device through the pictorial display. The service management system proposed there concentrates particularly on the problem of refilling empty printer cartridges and is therefore not directed at the general problem of providing the most effective control possible of user dialogs on especially complex installations.

SUMMARY OF THE INVENTION

Consequently, it is an object of the present invention to improve a method and device of the type named at the outset to the effect that control of user dialogs on particularly complex installations or equipment can be achieved as effectively as possible. In particular, a method and a device for controlling user dialogs shall be proposed that make practicable the service and maintenance of complex technical mechatronic devices, such as automated teller machines or deposit refund systems.

It is therefore proposed in order to control user dialogs that the data concerning the condition of the technical installation are processed using a directed graph which comprises nodes and edges, wherein the nodes relate to different maintenance conditions of the installation, and wherein the edges relate to instructions for the user to transfer the installation from one of the nodes to another of the nodes.

Accordingly, the control of user dialogs is accomplished using the calculation of data as part of a graph model formed of nodes and edges so that as a result particularly effective control of user dialogs can be exercised by displaying instructions to the user corresponding to the edges definable in the model. As a result of this measure, generating multi-stage user dialogs can be automated. The individual steps to be taken by the user are understood to be nodes of the directed graph, and an optimal order or sequence of instructions and/or commands for the particular maintenance event is determined for the user from the edges. For the particular activity to be performed, each edge corresponds to one such instruction or command with which the installation can be transferred from one condition (node N) to another condition (node N+1). By following the sequence, the user gradually brings the installation into the desired condition (e.g. automated teller machine filled with bank notes).

Preferably one initial node and at least one target node are identified from the data that relate to an initial condition to be improved and a desired target condition for the installation, wherein, by means of a route plan method, a sequence of edges is identified that corresponds to the shortest path from the initial node to the particular target node. With the method proposed here, route planning known otherwise only from the field of navigation systems can be applied to arrive at an optimal control of user dialogs. The mechanical dependencies resulting from the design of the device can be acquired very simply and solved efficiently at any given time by means of methods for route planning. The user, or the service technician, is thus guided specifically through the design of the device somewhat in the form of service navigation supported by route planning, directly from a starting point on the shortest way to the target point. The respective current position can be ascertained through suitable sensors, such as light curtains, switches, etc., and taken into account in the service navigation. Accordingly, the method proposed here knows the specific current position and thus knows exactly where and at which component of the device the user is presently located and to where he must be guided. The method indicates precisely in which order suitable instructions for the respective next step must be displayed.

Accordingly, it is advantageous if, using the data that are identified in particular by sensors in the installation, a initial node and at least one target node are identified that relate to an initial condition to be corrected and a desired target condition for the installation, and if by means of a route-plan method, a sequence of edges is determined that corresponds in the graph to the shortest path from the initial node to the particular target node (Z1). In this way, Dijkstra's algorithm can be applied, for example, in order to solve a complex failure situation in the optimal time possible.

To control the user dialog, control data will be generated, particularly control data comprising textual data and/or pictorial data to display the instructions, and sent to a display device.

The method can also be configured such that, based on user data, a determination can be made for which of the nodes and/or edges of the graph the particular user has authorization to receive corresponding instructions to transfer the installation from one of these nodes to another of these nodes and/or to carry out said instructions. In this context it is advantageous in the event that the user should not have any authorization for nodes and/or edges for the shortest path if, using the route planning method, a different sequence of edges is identified than the one which corresponds to the shortest path from the initial node to the particular target node.

With this method, several target nodes can be determined from the data, each of which relates to a desired target condition and/or interim condition for the installation, wherein a succession of target nodes is determined based on an optimization method. For example, an algorithm to solve the traveling salesman problem can be applied as the optimization method.

A device to control user dialogs on a technical installation to be serviced is also proposed here, wherein the device has a computing unit that evaluates data about the condition of the technical installation and, depending on the evaluation, controls at least a visual output of textual and/or pictorial instructions for a user maintaining the technical installation, where the computing unit processes the data based on a directed graph containing nodes and the edges joining the nodes, where the nodes relate to different maintenance conditions of the installation, and the edges relate to instructions for the user for transferring the installation from one of the nodes to another node.

The computing unit at least can be located spatially removed from the installation and be connected over a data interface with at least one sensor mounted in the installation by means of which the data about the condition of the technical installation are determined.

The computing unit can also be connected over a, or the same, data interface to a display unit mounted in the installation by means of which the instructions are displayed for the user.

Alternatively, the device can be integrated into the installation, wherein the computing unit is connected to at least one sensor mounted in the installation by means of which the data about the condition of the technical installation are identified, and wherein the computing unit is connected to a display unit mounted in the installation by means of which the instructions for the user are displayed.

Similarly here, a technical installation is also proposed having such a device to control user dialogs on a technical installation to be serviced, wherein the device has a computing unit that evaluates data about the condition of the technical installation and, depending on this evaluation, controls a visual output of textual and/or pictorial instructions for a user servicing the technical installation, wherein the computing unit processes the data on the basis of a directed graph that comprises nodes and the edges joining the nodes, wherein the nodes relate to different maintenance conditions for the installation, and the edges relate to instructions for the user for transferring the installation from one of the nodes to another node.

The technical installation can preferably be a cash dispenser or a deposit return device.

BRIEF DESCRIPTION OF THE DRAWINGS

In what follows, the invention is described more closely based on embodiments and with reference to the attached drawings.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 7:
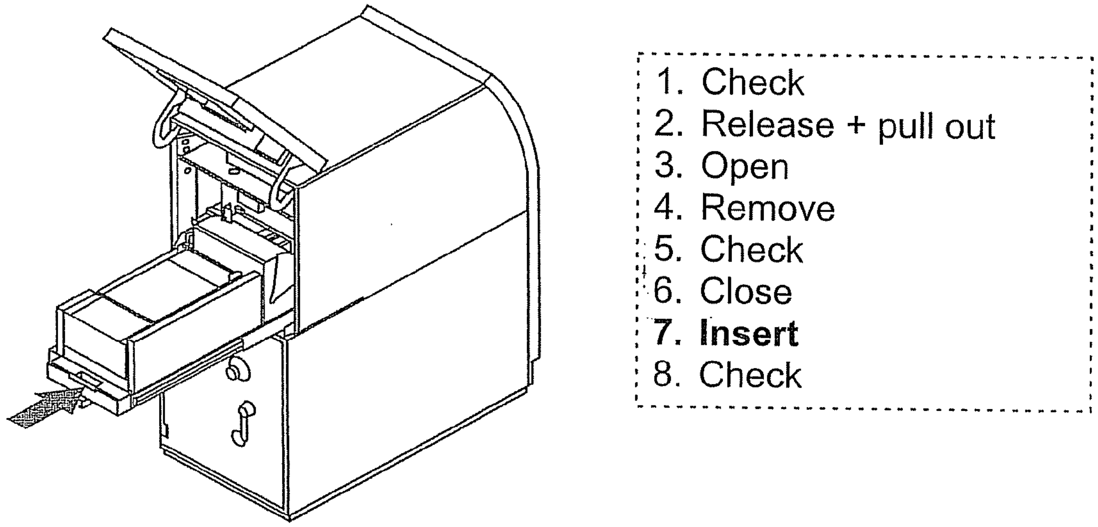
Figure 8:
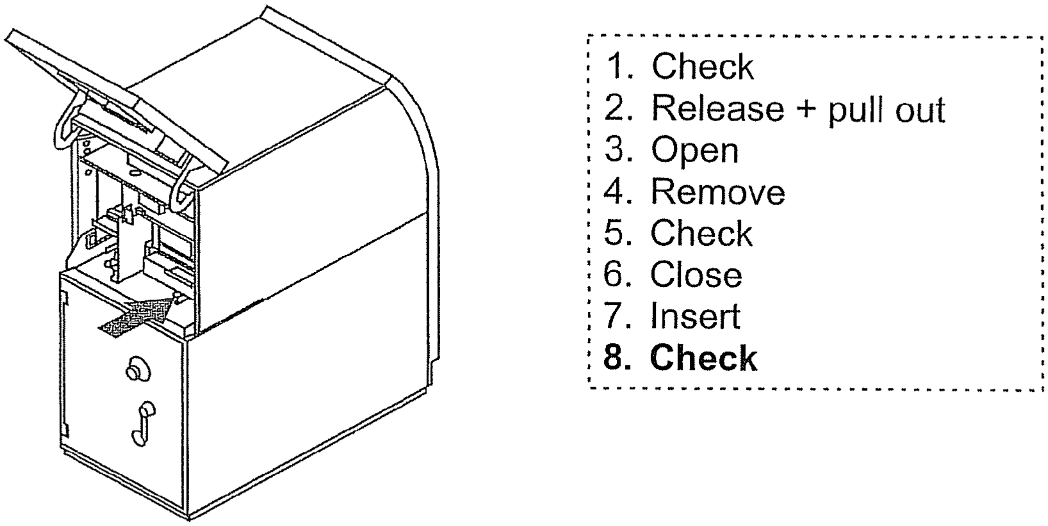
Figure 9:
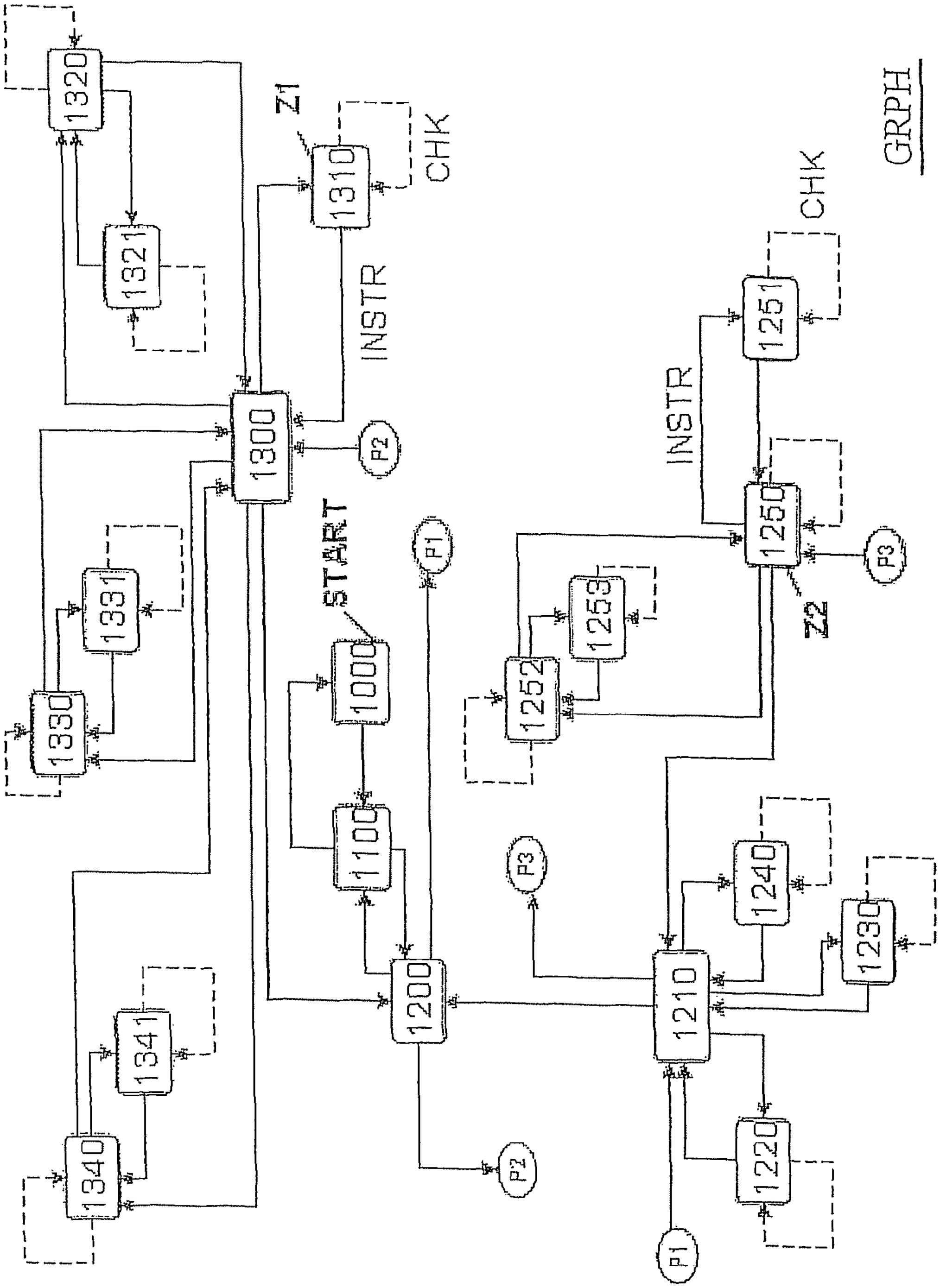
FIG. 9 represents a graph with nodes and edges determined by the method in accordance with the invention.
Figure 10:
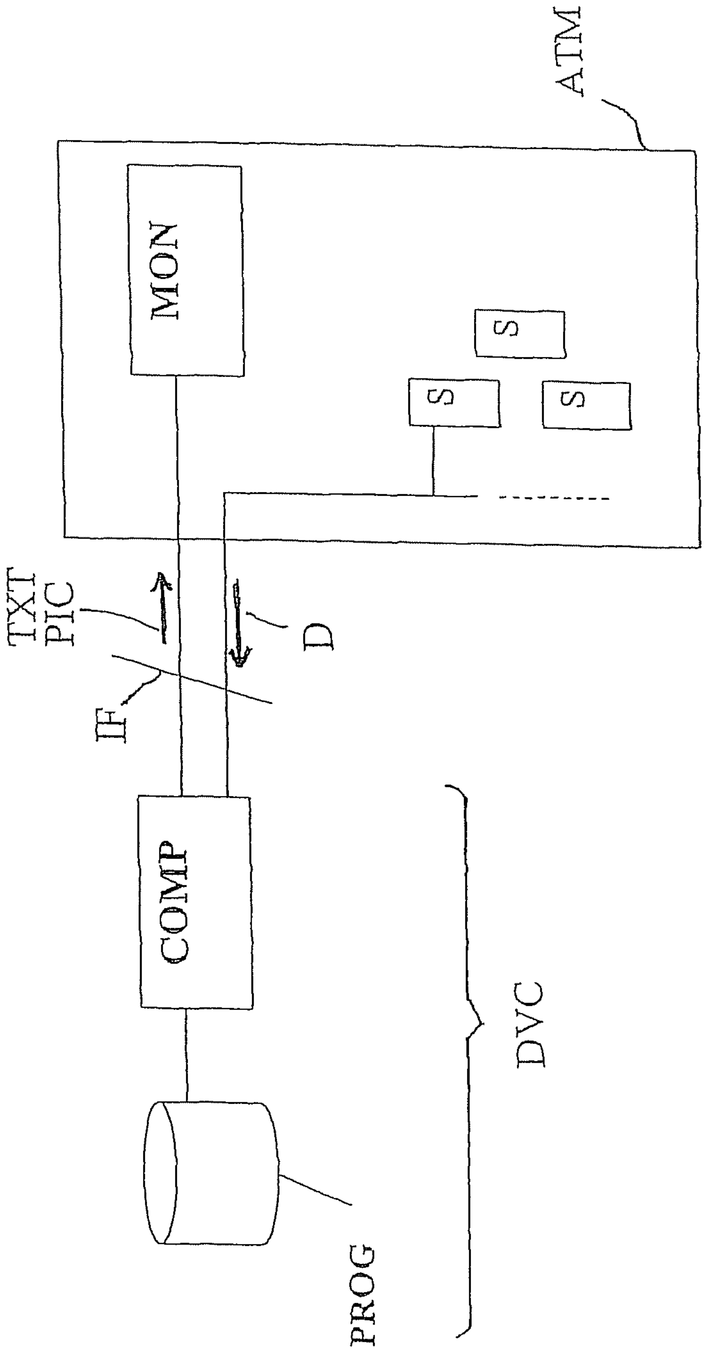
FIG. 10 shows a schematic representation of the device in accordance with the invention for maintaining a technical installation in the form of a cash dispenser.

Before FIGS. 1 to 8 are discussed in greater detail, the method in accordance with the invention and the device shall be described more closely on the basis of FIGS. 9 and 10:

FIG. 9 shows as an example a directed graph GRPH used by the method that contains several nodes 1000, 1100, 1200, 1210, . . . 1300, 1310 . . . etc., which are linked to each other by edges, or directed connections. Each of the edges corresponds to a concrete instruction, such as INSTR, or CHK, which relate to a step to be performed by the user. As an example, the instruction INSTR can relate to an instruction or command according to which the user is requested to open a door on the device. The instruction CHK can relate to an instruction for the user to check or inspect a particular condition. As an example, the user is to be advised by the instruction CHK to check whether an object can be found at a particular location in the device, for example, a bank note on a transport device within the cash dispenser.

The graph GRPH shown in FIG. 9 thus represents a logical structure following which the method is performed within a computing unit. The application of a graph method has the advantage that even very complex circumstances or maintenance conditions in the device can be optimally identified and evaluated very efficiently.

The graph GRPH made up of nodes and edges represents, then, the procedure in accordance with the invention as follows:

A trouble site corresponds to a specific (target) node, e.g. node 1300. The user dialog is the result of the sequence of individual nodes on the path from the initial node, e.g. 1000, to the target node, e.g. 1300.

The additional FIGS. 1-8 described more closely in the following, and using the example of a cash dispenser to be serviced, show basically a user guide generated or controlled in accordance with the invention, and clarify the individual steps that the user should carry out on the basis of the sequence of instructions or commands that are displayed to him.

FIG. 10 shows the structure of a device DVC for controlling user dialogs on a technical installation to be serviced, here shown in the form of a cash dispenser ATM. The cash dispenser ATM includes a display device in the form of a monitor or display MON. Additionally, sensors S are located in the cash dispenser ATM at different points with which the condition of the cash dispenser ATM can be monitored. The cash dispenser ATM is connected over an interface IF to the device DVC which consists essentially of a computing unit COMP and a memory on which program data PROG and application data are stored.

In accordance with the invention, the computing unit COMP receives the data D collected by the sensors S in the cash dispenser ATM and can thus determine the current condition of the cash dispenser ATM. The sensors S are, for example, light curtains, reed contacts, switches and similar, by means of which specific conditions can be inspected at various points of the cash dispenser ATM. In particular, failures that occur, such as the jam in a transport device for bank notes, can be detected. The actions performed by the user or service technician can be monitored by means of the sensors S, for example by determining that a particular door, drawer or similar in the cash dispenser ATM has been opened or closed.

The computing unit COMP now identifies the current condition of the cash dispenser ATM on the basis of the graph described previously (refer also to FIG. 9) and guides the user by the step-by-step display of commands to service the cash dispenser ATM correctly and efficiently. To this end, the computing unit COMP sends appropriate control data over the interface IF that comprise textual and/or graphic data TXT or PIC to a display device such as the monitor MON of the cash dispenser where appropriate instructions are displayed to the user. Such instructions are presented in more detail in FIGS. 1 to 8.

In the present example a bank note jam inside a transport device of the cash dispenser ATM is to be corrected as quickly as possible and efficiently. The sequence of the steps to be performed for this purpose is the result of route planning based on the graph (for example GRPH in FIG. 9). Starting from an initial node START, e.g. example of node 1000 that relates to the condition of the closed cash dispenser ATM, the user is guided on the shortest way to the failure location that was determined, here to node 1300 that relates to that location in the transport device at which a bank note jam has occurred.

Figure 1:
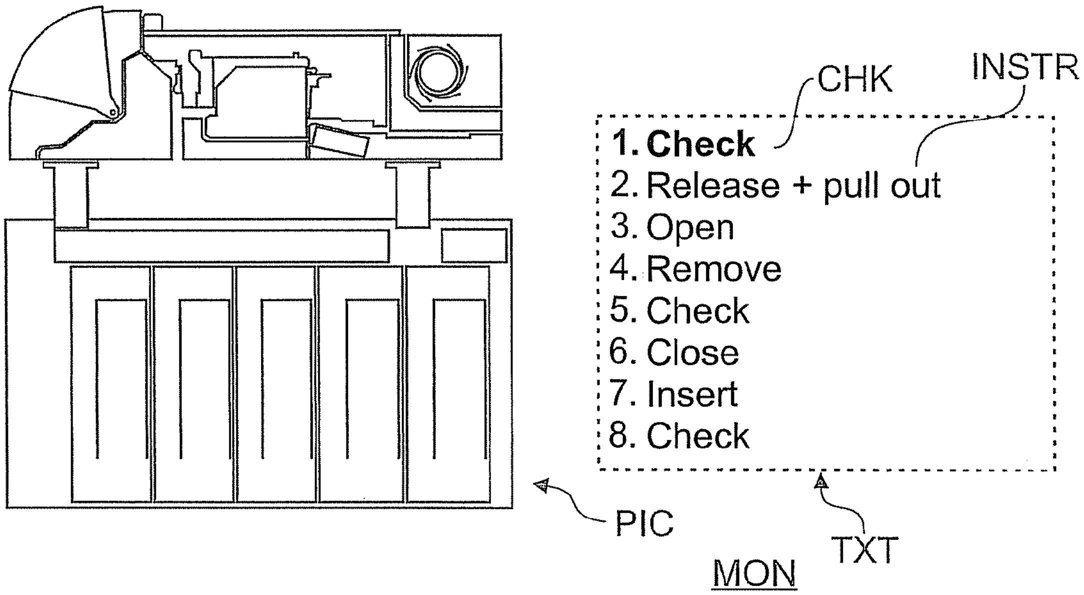
FIGS. 1-8 represent the display for individual steps as part of a user dialog.

The method in accordance with the invention guides the user successively as part of a user dialog starting from initial node 1000 over nodes 1100, 1200 (and connecting point P2) to the target node 1300. The method can proceed as follows, wherein reference is made in particular to FIGS. 1 to 8:

First, the user is instructed by a display on the monitor MON to check the actual error message that is also displayed (refer to FIG. 1). This instruction is given both in the form of a text TXT "Check" and in the form of a pictorial representation PIC that depicts the essential structure of the cash dispenser. FIG. 1 does not show any first user action in the stricter sense but rather for the moment presents the objective to the user, such as the buffer storage in the cash dispenser, also called the "escrow." In the steps following, the user is then guided to this location and back again. In this sense the system can arrive at the conclusion as early as the first display (refer to FIG. 1) that the user does not possess the necessary rights of access and can display this to him. However, since in this example the user is authorized to advance to the target, additional steps or displays follow as part of a user dialog.

Figure 2:
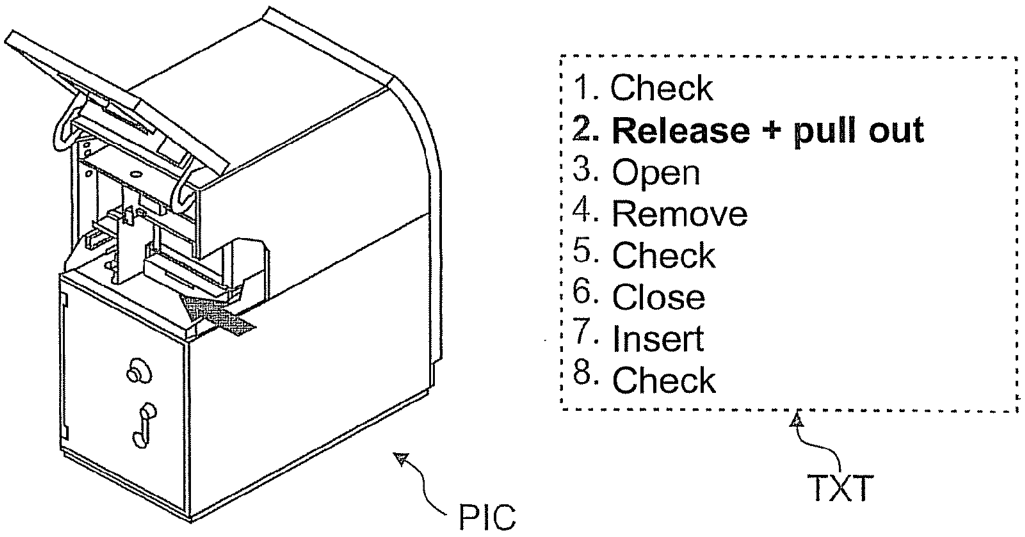
Figure 3:
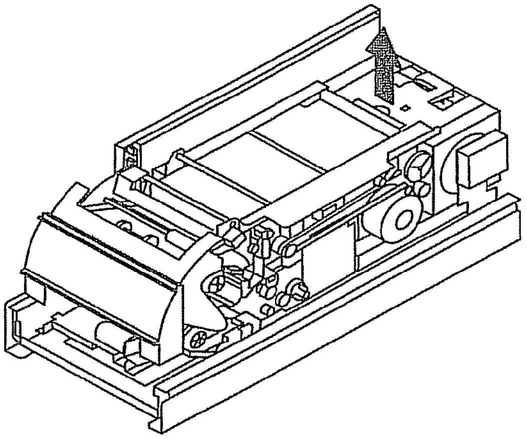
Figure 4:
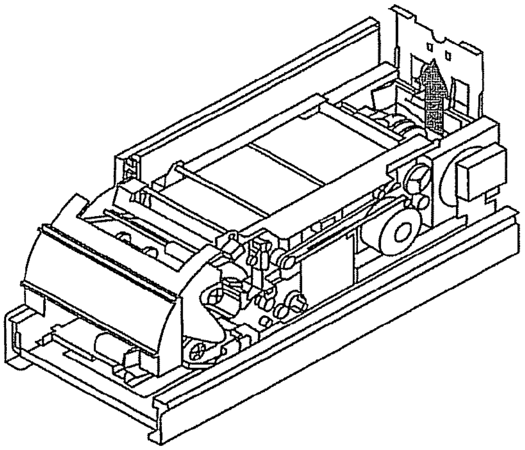
Figure 5:
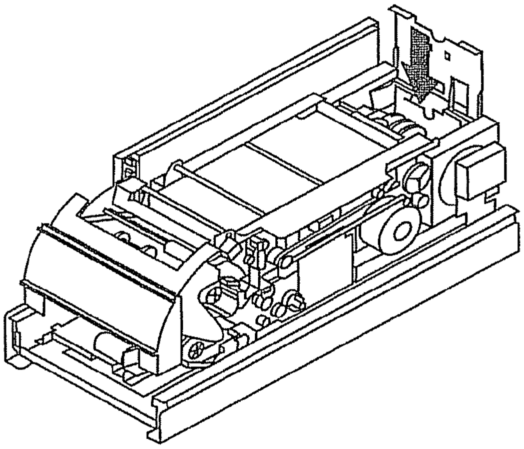
Figure 6:
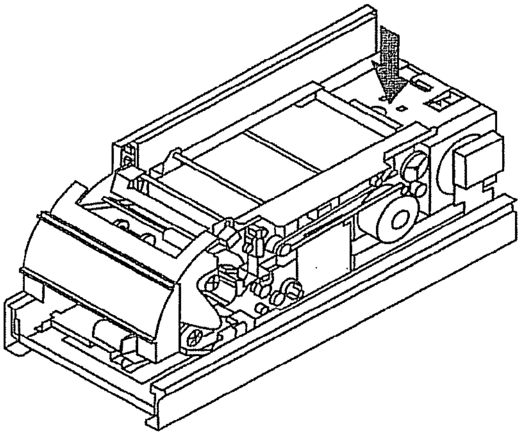

In a further step the user is now instructed to open a first door on the cash dispenser ATM and to release a lock in order to pull out the transport device (refer to FIG. 2). If the user has performed this activity successfully, which can be verified immediately through the sensor system, the device DVC gives a further instruction to open a specific door inside the transport device (refer to FIG. 3).

Then the user is required in a further step to remove the jammed bank notes inside the transport device (FIG. 4) In a further step (FIG. 5), the user is then instructed to check the condition of the transport device with the object of seeing whether there are any more bank notes jammed there.

After this, comes the instruction (FIG. 6) to close the door on the transport device again. Subsequently, the user is instructed to re-insert the transport device in the cash dispenser ATM (FIG. 7). Finally, the user is requested to lock the outer door on the cash dispenser and to inspect the overall condition of the cash dispenser once more (FIG. 8).

The user or service technician is thus automatically guided gradually and specifically as part of a user dialog in such a manner that the service or maintenance of the cash dispenser ATM can be performed effectively and quickly. The invention utilizes a graph method to which intrinsically known route planning can be optimally applied. As a result, it is possible, among other things, to determine the shortest path and thus the fastest procedure for correcting a fault condition.

The method in accordance with the invention can comprise several target nodes or interim nodes (refer to Z1 and Z2 in FIG. 9), whereby very complex circumstances can be broken down into individual partial problems and corresponding solutions (interim objectives).

The method proposed here also makes practicable a differentiation in the control of user dialogs on the basis of authorization assigned to the individual user. If, for example, the user is not authorized to enter particularly sensitive areas of the cash dispenser ATM, for example locations where there are bank notes, this is taken into account by the method in accordance with the invention and implemented correspondingly when controlling the user dialogs. The metainformation of the edges, that is the information about the edges or additional information on the edges, (e.g. user access rights) can also lead to the finding that the desired target node cannot be reached with the existing rights of access. In such cases, the result is a user dialog that consists of a single step in which the user is informed that he does not possess the necessary rights of access. It can also happen that the user is guided, not on the shortest way, but on a detour to the desired target node, wherein individual nodes or locations in the cash dispenser to which the user has no access are circumvented.

The device in accordance with the invention (refer to DVC in FIG. 10) can be configured as a separate device that is connected over an interface, for example over a network connection, to the particular device to be serviced. The device can be completely or partially (individual components of the device) integrated into the unit to be serviced. As an example, the computing unit and/or the display device used for displaying the instructions (monitor or display) can be a component of the unit to be serviced, or cash dispenser ATM.

As part of the user dialog depicted here, other information that was derived from the path can also be presented in advance. This could be, for example:

Illustration of the objective (c.f. FIG. 1)

Message that the objective cannot be attained

Details of the tools required for the path: In this case the edges contain additional information regarding the action, e.g. that a "screwdriver is required." For this the agreed quantity of all tools can be determined via the edges of the path.

Degree of difficulty of the path, for example, with reference to "general user," "valuables transport owner," or "bank employee."

Numerous additional variations and modifications of the invention described are possible. Use of the invention is particularly suitable for the maintenance of cash dispensers and deposit refund devices, but is not limited to such uses.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for controlling user dialogs on a technical equipment (ATM) to be serviced for maintenance, the technical equipment (ATM) being a cash dispenser or a deposit return device, wherein a computing unit (COMP) evaluates data (D) about the condition of the technical equipment (ATM), the data (D) including data identified by sensors, and, depending on said evaluation, controls at least a visual output of textual and/or pictorial instructions (INSTR; CHK) for a user maintaining the technical equipment (ATM), characterized in that the method processes the data (D) using a cyclic directed graph (GRPH) that comprises nodes (1000, . . . , 1300 . . . ) and edges (INSTR, CHK) connecting the nodes, wherein the nodes relate to different maintenance conditions of the equipment (ATM), and the edges relate to the instructions (INSTR; CHK) for the user to transfer the equipment (ATM) from one of the nodes to another node, wherein, using the data (D), an initial node (START) and at least one target node (Z1, Z2) are identified that relate to an initial condition to be corrected and a desired target condition for the equipment (ATM), and wherein by means of a route plan method a sequence of edges is determined that corresponds in the graph to the shortest path from the initial node (START) to the particular target node (Z1), wherein by means of the route plan method a different sequence of edges is determined than the one that corresponds to the shortest path from the initial node (START) to the particular target node (Z1) if it is determined from the user data that the user has no authorization for the node and/or edges of the shortest path, and wherein, if the target node cannot be reached with the existing rights of access, a user dialog is displayed, the user dialog consisting of a single step in which the user is informed that he does not possess the necessary rights of access.

2. The method from claim 1, wherein to display instructions (INSTR; CHK) control data, in particular control data comprising textual data (TXT) and/or pictorial data (PIC) are generated and sent to a display device (MON).

3. The method from claim 1, wherein based on user data a determination is made for which of the nodes and/or for which of the edges of the graph (GRPH) the particular user has authorization to receive and/or to carry out appropriate instructions to transfer the equipment (ATM) from one of these nodes to another of these nodes.

4. The method from claim 1, wherein based on the data (D) several target nodes (Z1, Z2, . . . ) are identified that in each case relate to a desired target condition and/or interim condition of the equipment (ATM) and wherein based on an optimization method (TSP) a sequence is determined for the target nodes.

5. A device (DVC) for controlling user dialogs on a technical equipment (ATM) to be serviced for maintenance, the technical equipment (ATM) being a cash dispenser or a deposit return device, wherein the device has a computing unit (COMP) that evaluates data (D) about the condition of the technical equipment (ATM), the data (D) including data identified by sensors, and, depending on said evaluation, controls at least a visual output of textual and/or pictorial instructions (INSTR; CHK) for a user maintaining the technical equipment (ATM), characterized in that the computing unit (COMP) processes the data (D) using a cyclic directed graph (GRPH) that controls nodes (1000, . . . , 1300 . . . ) and edges (INSTR, CHK) connecting the nodes, wherein the nodes relate to different maintenance conditions of the equipment (ATM), and the edges relate to instructions to the user for transferring the equipment (ATM) from one of the nodes to another node, wherein, using the data (D), an initial node (START) and at least one target node (Z1, Z2) are identified that relate to an initial condition to be corrected and a desired target condition for the equipment (ATM), and wherein by means of a route plan method a sequence of edges is determined that corresponds in the graph to the shortest path from the initial node (START) to the particular target node (Z1), wherein by means of the route plan method a different sequence of edges is determined than the one that corresponds to the shortest path from the initial node (START) to the particular target node (Z1) if it is determined from the user data that the user has no authorization for the node and/or edges of the shortest path, and wherein, if the target node cannot be reached with the existing rights of access, a user dialog is displayed, the user dialog consisting of a single step in which the user is informed that he does not possess the necessary rights of access.

6. The device (DVC) from claim 5, wherein at least the computing unit (COMP) is located remotely from the equipment (ATM) and is connected through a data interface (IF) to at least one sensor (S) mounted in the equipment by means of which the data (D) about the condition of the technical equipment (ATM) are determined.

7. The device (DVC) from claim 6, wherein the computing unit (COMP) is connected over one, or the, data interface (IF) to a display unit (MON) mounted in the equipment (ATM) by means of which the instructions for the user are displayed.

8. The device (DVC) from claim 6, wherein the device is integrated into the equipment (ATM), wherein the computing unit (COMP) is connected to at least one sensor (S) mounted in the equipment (ATM) by means of which the data (D) about the condition of the technical equipment (ATM) are determined, and wherein the computing unit (COMP) is connected to a display unit (MON) mounted in the equipment (ATM) by means of which the instructions for the user are displayed.

9. Technical equipment (ATM) being a cash dispenser or a deposit return device and comprising a device (DVC) for controlling user dialogs on a technical equipment (ATM) to be maintained, wherein the device has a computing unit (COMP) that evaluates data (D) about the condition of the technical equipment (ATM) and, based on said evaluation, controls at least a visual output of textual and/or pictorial instructions (INSTR: CHK) for a user maintaining the technical equipment (ATM), characterized in that the computing unit (COMP) processes the data (D) using a cyclic directed graph (GRPH) that comprises nodes (1000, . . . , 1300 . . . ) and edges (INSTR, CHK) connecting the nodes, the data (D) including data identified by sensors, wherein the nodes relate to different maintenance conditions for the equipment (ATM), and the edges relate to instructions for the user for transferring the equipment (ATM) from one of the nodes to another node, wherein, using the data (D), an initial node (START) and at least one target node (Z1, Z2) are identified that relate to an initial condition to be corrected and a desired target condition for the equipment (ATM), and wherein by means of a route plan method a sequence of edges is determined that corresponds in the graph to the shortest path from the initial node (START) to the particular target node (Z1), wherein by means of the route planning method a different sequence of edges is determined than the one that corresponds to the shortest path from the initial node (START) to the particular target node (Z1) if it is determined from the user data that the user has no authorization for the node and/or edges of the shortest path, and wherein, if the target node cannot be reached with the existing rights of access, a user dialog is displayed, the user dialog consisting of a single step in which the user is informed that he does not possess the necessary rights of access.

* * * * *